May 24, 1927.
J. GOFF
1,629,696
PIPE RIP AND CUT-OFF
Filed March 22, 1926
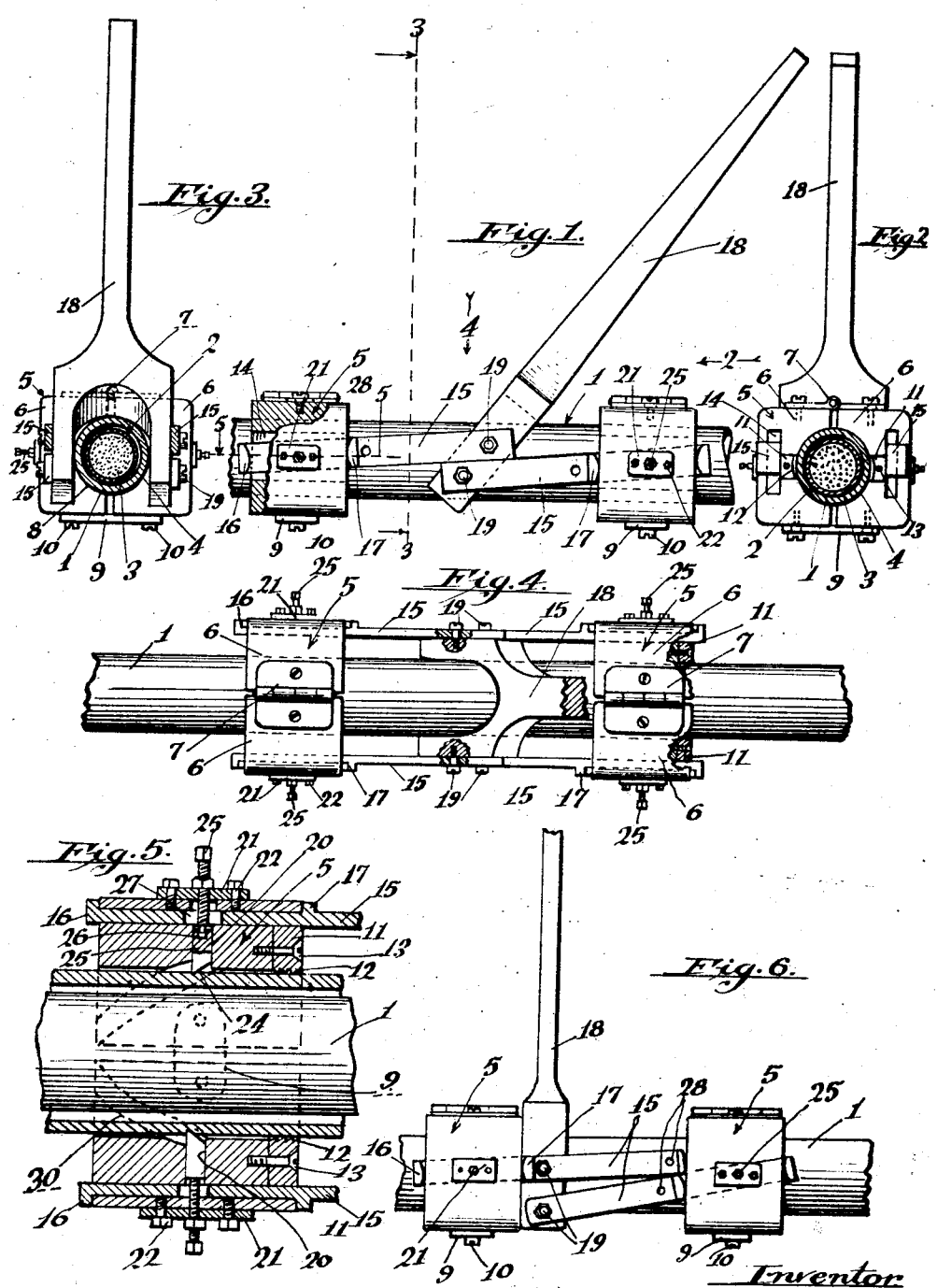
Inventor
Jess Goff.
by Hazard and Miller
Attorneys.

Patented May 24, 1927.

1,629,696

UNITED STATES PATENT OFFICE.

JESS GOFF, OF LOS ANGELES, CALIFORNIA, ASSIGNOR OF ONE-HALF TO LOUIS M. ADAMS, OF LOS ANGELES, CALIFORNIA.

PIPE RIP AND CUT-OFF.

Application filed March 22, 1926. Serial No. 96,561.

My invention is a pipe rip and cut off adapted to form longitudinal cuts along opposite sides of a pipe and to form circular cuts at opposite ends of the slit or rip in order to remove a section of pipe.

An object of my invention is a device for forming longitudinal cuts along opposite sides of a pipe and circular cuts at each end of the slit portion in order to remove the section of the pipe in two half sections.

A particular adaptation of my invention is to cut the casings in which electrical conduits are enclosed without injuring the electric wires.

It is the custom in telephone and other types of electrical conductors to have cables containing a great many independent electrical conductors enclosed in a covering generally a lead sheath, the lead sheath, the individual wires and the insulation forming the cable structure. This latter is inserted in the conduit or pipe or the like. Sometimes these pipes are made of fibrous material compressed, sometimes metal pipes are used and in other cases vitrified material is used to form the pipes.

As it is frequently necessary to open the conduit to have access to the cable and the wires therein, it is necessary to cut a section out of conduit. In this action frequently the cable has been damaged, in particular causing cutting or breakage of the wires in the cable, making a tedious job to form proper electrical connections again.

My appliance for forming a rip or slit in the pipe and circular cuts comprises a plurality of cutter holders each being adapted to fit around the conduit or pipe and to be clamped in position. These holders are provided with teeth adapted to become imbedded in the pipe in one direction of movement. The pair of cutter holders are connected by links to a lever so that when the lever is rocked backwards and forwards the cutters progress along the pipe in one direction, thereby forming rips or slits in the pipe.

After a sufficient length of pipe has been split in this manner the handle is shifted so as to form a lever and by means of suitable cutters a circular cut is made in the pipe, these cuts being at opposite ends of the slit portion so that a complete section of the pipe or conduit can be moved, these sections being in two halves split lengthwise.

My invention will be more readily understood from the following description and drawings, in which:

Figure 1 is a side elevation of the device mounted on a pipe or conduit.

Fig. 2 is an end elevation taken in the direction of the arrow 2 of Fig. 1.

Fig. 3 is a vertical cross section taken on the line 3—3 of Fig. 1, in the direction of the arrows.

Fig. 4 is a plan view partly broken away taken in the direction of the arrow 4 of Fig. 1.

Fig. 5 is a part longitudinal section taken on the line 5—5 of Fig. 1.

Fig. 6 is a side elevation showing the device as used for forming a circular cut around the pipe.

My rip and cut off device is primarily intended for use in cutting conduits such as indicated by the numeral 1 which may be in the form of pipes; these conduits being utilized to carry electric cables 2 having a body of wires 3 with insulation therein and a covering or casing 4 usually of lead. The use of my cutter is to rip and cut off a section of the pipe or casing 1 without damaging the cable either in cutting the sheath or distorting the cable or actually cutting the wires.

My implement comprises a pair of cutter holders 5 each formed of somewhat similar construction, being in two halves 6 secured together by hinges 7, the hinges being preferably on the top, the holders having substantially semi-circular cut-out sections 8 adapted to fit snugly around the conduit or pipe. A bar 9 is secured by screws 10 or the like to the base of the cutter holders which form a collar or the like around the pipe. These holders are sufficiently loose to allow ready slippage on the pipe. Each of the sections of the cutter holders are provided with toothed blocks 11 having gripping teeth 12 preferably secured to the holders by screws 13. These blocks are set in the sides of the cutter holders or otherwise positioned along one side and at the same ends of both the holders. The teeth 12 are so arranged as shown in Figs. 4 and 5 that they will dig into the pipe when drawn in one direction and slip over the pipe when forced in the opposite direction.

Longitudinal slots 14 extend through the cutter holders from one side to the other, extending axially of said holders and preferably adjacent the outer side. These slots form a means for housing links 15, the said links having outer abutments 16 and inner abutments 17. These abutments are adapted to engage opposite ends of each of the cutter holders and are rounded to allow slight rocking movement of the links 15.

Each of the links is connected to a handle 18, the pairs of links from one cutter holder being secured by bolts 19 which are somewhat spaced apart and will allow a rocking of the handle.

In accordance with my invention so far described after the cutter holders or collar blocks as they may be called are secured around a pipe or casing when the handle is rocked it will tend to draw the collar blocks towards each other as indicated by the position in Fig. 1. When the handle is forced to its extreme in the other direction the tendency is to force the blocks apart.

It will be noted that the block at the left hand end as shown in Figs. 1 and 4 has the toothed block 11 on the side adjacent the handle and that the right hand collar block has the toothed blocks on the end remote from the handle. The collars being in two halves and connected by a hinge may rock slightly so that the teeth 12 may become slightly imbedded in the pipe. The implement therefore may be utilized to travel along a pipe in the following manner:

Presuming the collar block at the right hand end of Fig. 1 or 4 is forced into tight engagement with the pipe, then on rocking the handle to the left in the opposite direction to that shown in Fig. 1, the distance between the collar blocks is increased, thereby forcing the left hand block longitudinally of the pipe. On swinging the handle again to the right the teeth on the left hand block dig into the pipes and as the distance between the two blocks is decreased they are drawn together into the position of Fig. 1. This action cuts slits or rips lengthwise of the pipe as hereunder set forth.

The manner of mounting the cutters is substantially as follows, having reference particularly to Fig. 5:

The halves of the cutter holders are provided with a hole 20 in the side preferably square, extending from the outside to the inside of the holders. A cover plate 21 is secured on the outside of the holders, being provided with screws 22 securing the plate in position. The cutters 23 have a suitable pointed cutting edge 24 with a suitable clearance and an adjusting screw 25 is attached to each cutter by means of a slot from one side or by peening the end of the cutter over a head 26 on the inner part of the screw. The portions of the links 15 in the slots 14 are provided with a cut-out section 27 of sufficient size to allow passage of the cutter with the screw for holding and adjusting same.

The manner of actuation of the cutters is substantially as follows:

It is presumed that a longtiudinal cut is to be made and the end of the cutters are in the position shown in Fig. 5. It will be noted as above described that the cutter holder collars progress in a longitudinal direction from right to left, being aided by the teeth 12 digging into the material of the pipe. As above mentioned when it is desired to thrust the cutter in a forward direction, the handle is swung towards the left. This action presses backwardly on the rearward cutter holder, the action causing the two halves of the holder to slightly swivel on the cutting tools held therein which are in engagement with the sides of the pipe and with the screws of the hinges 7. Thus the rearward cutter holder may swivel sufficiently on being pressed back to have the gripping teeth forced into the metal of the pipe.

The action of thrusting the forward cutter holder in a forward direction tends to swivel the holder with the tool acting as a pivot so that the teeth are drawn slightly away from the pipe. The next operation of the handle from the left back to the right causes the forward holder to swivel in the opposite direction with the teeth digging into the pipe, thereby holding same stationary and drawing the rearward cutter holder in a forward direction.

The cutters are forced into the work by actuation of the screws 25 and if one traverse of the section of the pipe to be cut does not form a complete cut the implement may be drawn backwardly and succeeding cuts made by forcing the cutter further into the pipe until a longitudinal slit is formed.

The tranverse slit is made substantially as follows:

The cover plates 21 are removed so that the cutter may be drawn out of the squared hole 20 and given a quarter turn so that the cutting edge is in a position to make a circular cut around the pipe. The cover plate is then attached and the screws 25 operated to press the cutters into the work.

If it is desired to make a circular cut with the forward cutting block as indicated in Fig. 6, the link connected with said block is disconnected from the handle by removing the bolts 19, thus releasing the said link and the handle is shifted, drawing the rearward cutter block so that the bolts 19 may be reinserted through the apertures 28 in the links. Thus the handle is positioned close to the cutter holder and may be removed, and utilized as a lever to rotate said holder. It will be understood that the cutting tools in the rearward cutter block will be loosened in this cutting operation. The cutters may be forced into the pipe and completely severed.

When it is desired to make a circular cut at the other end of the longitudinal slit the handle is placed in the reverse position adjacent the rearward cutter and operated as above described to make a circular cut in such position. When the cuts are completely made the implement may be readily removed from the pipe by reversing the operation of attaching it thereto. The two half sections of the pipe may then be readily removed, allowing access to the cable or any other article in the interior of the pipe.

It will be understood that if desired the circular cut may comprise only a semi-circle. Thus it would only be necessary to remove the one half section of the pipe which would be satisfactory for some purposes. The section could then be reinserted and soldered or otherwise secured in position.

From the above description it will be seen that I have developed a simple appliance for making rip cuts lengthwise of pipe and cut off cuts transversely thereto. The detail mechanism therefor to accomplish these objects could be considerably changed in general construction and in specific details without departing from the spirit of my invention as set forth in the description, drawings and claims.

It will be noted in Fig. 5, that chip removing grooves indicated by the numeral 30 allow the chips to follow the groove in the sections of the block and be discharged at the end thereof; thereby preventing the blockage of the tool with the chips.

Having described my invention, what I claim is:

1. A pipe rip and cut-off comprising in combination a pair of cutter blocks having cutter tools, means on said block to engage a pipe, and means interconnecting said blocks and operated to traverse said blocks in successive steps lengthwise of the pipe.

2. A pipe rip and cut-off comprising in combination a pair of cutter holding blocks adapted to encircle a pipe, cutters mounted in said blocks, means on said blocks to engage a pipe, means interconnecting said blocks and operated to traverse the blocks lengthwise of the pipe step by step, and means to rotate the cutter blocks around the pipe.

3. A pipe rip and cut-off comprising in combination a plurality of pairs of cutting tools, means supporting same adjacent opposite sides of a pipe, a handle operatively connected to said supporting means, means to traverse the supporting means lengthwise of the pipe by longitudinally rocking the handle, said supporting means permitting rotation of the tools around the pipe by rotating the handle therearound.

4. A pipe rip and cut-off comprising in combination a plurality of collar-like cutting holder blocks adapted to encircle a pipe, cutters mounted in the sides thereof, links connected to said blocks, a handle connected to the links, and gripping means on the blocks adapted to engage the pipe.

5. A pipe rip and cut-off as claimed in claim 4, having in addition an adjustable connection of the handle to the links to utilize the handle to turn the blocks for forming a circular transverse cut around the pipe.

6. A pipe rip and cut-off comprising in combination cutter holding blocks formed in two sections hinged together, adapted to encircle a pipe, with means to secure same around a pipe, adjustable cutters mounted in each section of the blocks, links loosely connected to the sides of the blocks, a handle pivotally connected to the links by spaced pivots, gripping teeth secured to the blocks adapted to engage a pipe and cause step by step longitudinal movement of the blocks relative to the pipe on oscillating the handle.

7. A pipe rip and cut-off as claimed in claim 6, in which the pivots are removable from the handle and the links are provided with apertures to position the handle close to the blocks to traverse the blocks around the pipe.

8. A pipe rip and cut-off comprising a pair of cutter holder blocks, each of said blocks being formed in two sections hinged together and having means to secure same around a pipe, the sections having a longitudinal slot therethrough on the sides, links loosely connected through said slots, a handle pivotally connected to said links, the said pivots being spaced apart, tools mounted in the sides of the said sections having means to adjust same to cut to different depths and means on the sections adapted to grip a pipe and allow lengthwise traversing of the pipe on the oscillating movement of the handle in the direction of the pipe.

9. A pipe rip and cut-off as claimed in claim 8, in which the tools are mounted in holes formed in the sections of the blocks, the tools being rotatable to cut lengthwise or crosswise of the pipe, and means to rotate the blocks around the pipe to form cross cuts.

In testimony whereof I have signed my name to this specification.

JESS GOFF.